United States Patent [19]
Gavin et al.

[11] Patent Number: 5,832,239
[45] Date of Patent: *Nov. 3, 1998

[54] HIGH PERFORMANCE COMMUNICATIONS PATH

[75] Inventors: Derwin DeLon Gavin; Daniel Cletus Gillen; Jessie Ann Hays Haug, all of Austin; James Britt Partridge, Bastrop; Lance Warren Russell, Fredericksburg; Eldon Perry Smith, Leander, all of Tex.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[*] Notice: The term of this patent shall not extend beyond the expiration date of Pat. No. 5,737,543.

[21] Appl. No.: 823,353

[22] Filed: Mar. 24, 1997

Related U.S. Application Data

[63] Continuation of Ser. No. 392,576, Feb. 23, 1995, Pat. No. 5,737,543.

[51] Int. Cl.⁶ ..................................................... H01J 13/00
[52] U.S. Cl. ........................... 395/285; 395/286; 395/831; 395/832; 395/836; 395/851; 395/858
[58] Field of Search ...................................... 395/825–826, 395/838, 851, 853, 857, 858, 700, 200.11, 200.12, 200.14, 284–285, 287, 680–685, 686, 527

[56] References Cited

U.S. PATENT DOCUMENTS

| | | | |
|---|---|---|---|
| 5,165,030 | 11/1992 | Barker | 395/500 |
| 5,394,524 | 2/1995 | Dinicola et al. | 395/163 |
| 5,513,328 | 4/1996 | Christofferson | 395/280 |
| 5,530,848 | 6/1996 | Gilbert et al. | 395/600 |
| 5,546,584 | 8/1996 | Lundin et al. | 395/700 |

*Primary Examiner*—Meng-AI T. An
*Assistant Examiner*—Raymond N. Phan
*Attorney, Agent, or Firm*—Richard A. Henkler; Jack V. Musgrove; Andrew J. Dillon

[57] ABSTRACT

A computer system, memory, and computer-implemented method for generating at least one high performance communication path is provided. The communication path has a plurality of linked components, including a negotiator and a controller. The method includes the steps of registering the negotiator with the controller (e.g. stream head), verifying acknowledgement of negotiation from each component linked between the negotiator and the controller, and in response to a valid verification, redirecting I/O between the controller and the negotiator.

15 Claims, 3 Drawing Sheets

HIGH PERFORMANCE COMMUNICATIONS PATH

This application is a continuation, of application Ser. No. 08/392,576, filed Feb. 23, 1995 U.S. Pat. No. 5,737,543.

BACKGROUND OF THE INVENTION

1. Field of the Invention

The present invention relates to high performance two way data transfer and processing paths.

2. Background Information and Description of the Related Art

The STREAMS framework provides a flexible set of tools for developing UNIX system communication services. It defines a generic message-driven queuing interface and provides tools for implementing communication services, such as a networking protocol stack. STREAMS does not impose any specific network architecture, rather, it is simply a framework. STREAMS is a common term in the computer art for a two way data transfer and processing path (i.e. Stream) between a device driver in kernel space and a user process in user space.

Referring to FIG. 1, an operating system typically constructs a Stream by linking several independent components, such as a stream head 20, several modules 30 (optional), and device driver 40. The stream head 20 includes service routines for processing all STREAMS related system calls made to the Stream and provides an interface between the Stream and user process 10. User process 10 initiates system calls, such as OPEN, CLOSE, READ, WRITE, and IOCTL (i.e. I/O requests). The OPEN system call builds the Stream by allocating stream head 20 and two queues for each STREAMS component (e.g., 20, 30, and 40), one for transmitting STREAMS messages (described herein) downstream and one for transmitting STREAMS messages upstream. Therefore, system calls travel downstream and are processed through stream head 20, module 30, driver 40, and finally to device 50. Similarly, data received by driver 40 from device 50 travel upstream and are processed through driver 40, module 30, stream head 20, and finally to user process 10.

When user process 10 issues an IOCTL call, if the IOCTL is a generic stream head command, stream head 20 processes the IOCTL. A generic stream head command is a command designed specifically for stream head 10 to process, such as I_PUSH or I_POP. If the IOCTL is not a generic stream head command, stream head 20 repackages the IOCTL into a STREAMS M_IOCTL message and sends it downstream for processing by modules 30 and/or driver 40.

Module(s) 30 include a set of kernel-level routines and data structures for processing status information, data, and control information traveling between stream head 20 and driver 40. For example, modules 30 may reformat data to meet requirements of a specific communications protocol. The STREAMS framework permits stream head 20 to selectively push (i.e., insert) or pop (i.e., remove) one or more modules 30 from the Stream. Driver 40 supports an external I/O device 50 or pseudo-device. Typically, driver 40 handles data transfers between the kernel and device 50, but performs little or no data processing other than converting STREAMS messages to hardware events and hardware events into STREAMS messages.

STREAMS messages are the communicating vehicle between components of the Stream. A STREAMS message contains data and/or other information originating from driver 40, module(s) 30, or stream head 20. STREAMS messages can have up to 256 different priorities to support requirements for multiple bands of data flow. At a minimum, STREAMS messages distinguish between normal (priority zero) and high priority messages.

Each STREAMS component's queue contains one put procedure and one service routine (optional). The put procedure and service routine include software routines for processing all STREAMS messages that transit its queue. Conventionally, to send messages between queues, a first put procedure in one queue calls a second put procedure in an adjacent queue. As a result, the second put procedure receives the message from the adjacent queue and immediately processes that message on its queue if resources are available. To do so, the put procedure first examines the message type (e.g., user data message, control information message) and then determines if it can handle the message. If it cannot handle the message, the put procedure merely passes the message to the next component by calling the next component's put procedure. If the put procedure can handle the message, it does so. This may entail repackaging (i.e., modifying) the message, creating one or more new messages and sending them upstream or downstream, or completely handling the message without generating or passing any messages.

However, if the queue's resources are available, but the put procedure of a particular component cannot immediately process a message, the STREAMS framework enqueues that particular component's queue on a STREAMS scheduling queue for later processing by the service routine of the particular component. Next, the STREAMS scheduler calls the service routine of each queue that has been enqueued on its scheduling queue, one at a time in FIFO order. Once the scheduler calls the particular component's service routine, that service routine processes all messages on its queue unless prevented by flow control.

On the other hand, if a receiving put procedure or service routine cannot process a message because resources are not available or flow control has been installed, the calling put procedure or service routine places the message back onto its queue. The STREAMS scheduler then reschedules the service procedure to call the put procedure when resources are more likely to be available. Obviously, the process of sending STREAMS messages up and down the Stream can be very inefficient if the Stream is busy.

Unfortunately, however, because normal component processing of STREAMS messages may not always be required, the previously described conventional STREAMS framework has certain disadvantages and limitations. Normal processing is not required when both user process 10 and an intervening STREAMS component (e.g., device driver 40) can receive data in a less processed form, either because user process 10 can receive data from module 30 or driver 40 with no further formatting or because module 30 or driver 40 can receive data from user process 10 with no further formatting, as in a bulk data transfer or in the ability to receive data in an unprocessed, raw form. Obviously, in this situation, any intervening modules that reformat data are not required.

Nevertheless, in the conventional STREAMS framework, if one STREAMS component needs to communicate with another STREAMS component, all STREAMS messages must pass through any intervening component's queue, regardless of whether processing is required by those intervening components. However, as previously described, the process of sending STREAMS messages up and down the Stream is very inefficient if the Stream is busy. In fact, this inefficiency can generate a performance penalty of up to six fold increase in processing time.

Accordingly, if a STREAMS device driver and/or any other STREAMS component could detect an event indicating that intervening STREAMS message processing is not required and then bypass that intervening processing, substantial performance enhancements would be achieved.

SUMMARY OF THE INVENTION

In accordance with the present invention, a computer system, memory, and computer-implemented method generate a high performance communication path (e.g., Stream). The communication path has a plurality of linked components, including a negotiator and a controller. The method includes the steps of registering the negotiator with the controller (e.g. stream head) in response to initiating (e.g., opening) a communication path (e.g., a stream), verifying acknowledgement of negotiation from each component linked between the negotiator and the controller, and in response to a valid verification, redirecting I/O between the controller and the negotiator.

Therefore, it is an object of the present invention to detect an event indicating that intervening message processing is not required.

It is another object of the invention to selectively bypass all components in the communication path that perform unneeded intervening processing.

These and other objects, features, and advantages will become even more apparent in light of the following detailed description and drawings.

DETAILED DESCRIPTION OF THE PREFERRED EMBODIMENT

The following detailed description is of the best presently contemplated mode for carrying out the invention. This detailed description is not to be viewed in a limiting sense, but is made merely for the purpose of illustrating the general principles of the invention, the scope of which is only defined by the appended claims.

The preferred embodiment includes a system, method, and memory for generating high performance STREAMS. The preferred embodiment is implemented within the AIX™ operating system and, therefore, produces an enhanced operating system. However, one skilled in the art readily recognizes that any operating system utilizing STREAMS could implement the preferred embodiment, such as, for example, Novell's Netware,™ Sun's Solaris,™ and HP's HP-UX.™

Figure 2:
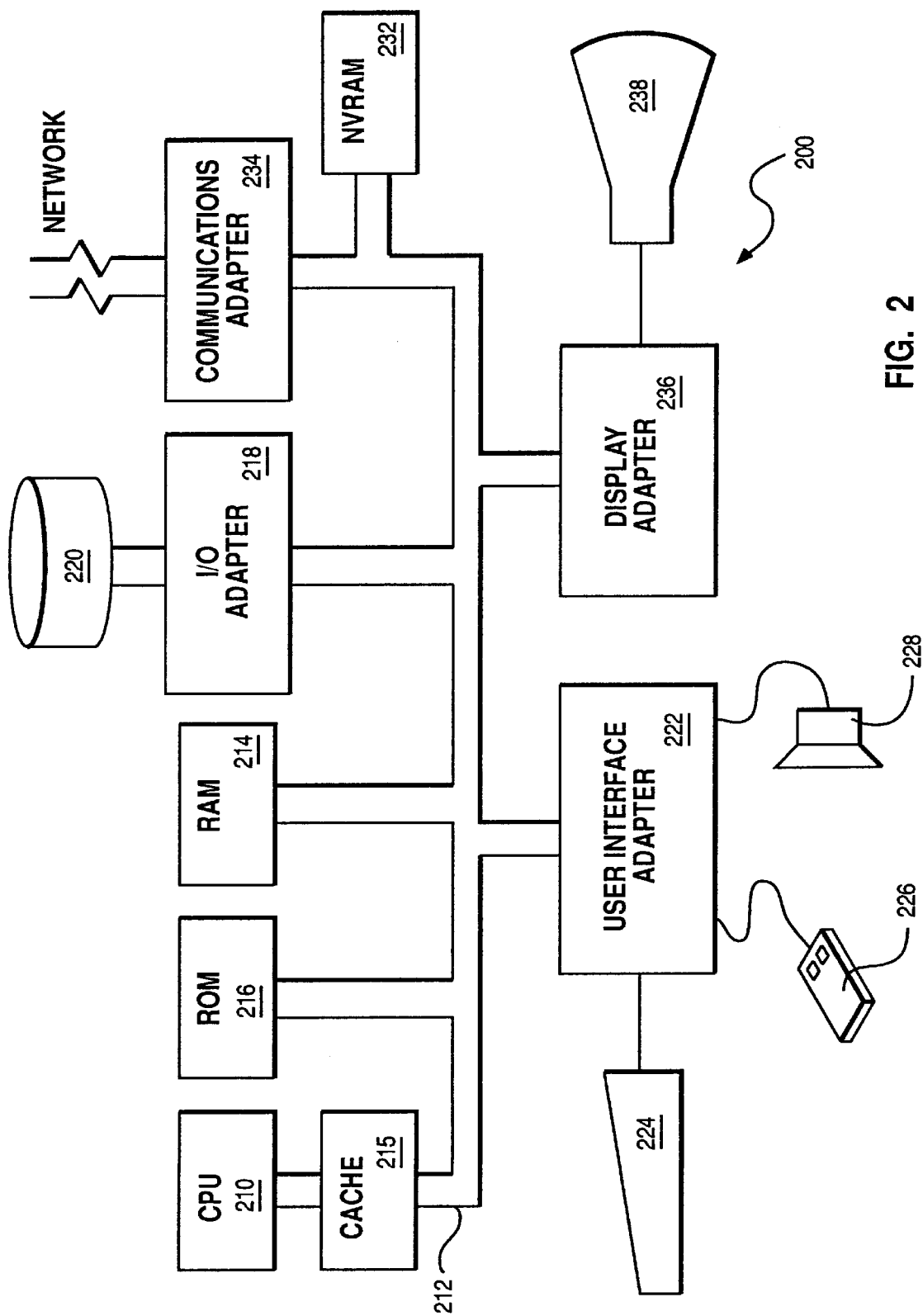
FIG. 2 illustrates a block diagram of a representative hardware configuration for implementing the present invention.

The preferred embodiment may be practiced in any suitable hardware configuration, such as the hardware configuration illustrated in FIG. 2, or, alternatively, a laptop computer. Referring to FIG. 2, workstation 200 includes any suitable central processing unit 210, such as a conventional microprocessor (e.g., IBM's™ PowerPC™), and a number of other units interconnected via system bus 212. Illustratively, workstation 200 includes cache 215, non-volatile RAM 232, random access memory ("RAM") 214, read only memory ("ROM") 216, display adapter 236 for connecting system bus 212 to display device 238, and I/O adapter 218 for connecting peripheral devices (e.g. disk and tape drives 220) to system bus 212. Workstation 200 further includes user interface adapter 222 for connecting keyboard 224, mouse 226, speaker 228. microphone 232, and/or other user interface devices, such as a touch screen device (not shown), to system bus 212. Communication adapter 234 connects workstation 200 to a data processing network.

The enhanced operating system (OS), as computer readable program code, resides within a machine-readable media (e.g., memory) to direct the operation of workstation 200. Any suitable memory may retain the enhanced OS, such as RAM 214, ROM 216, a magnetic diskette (e.g., floppy diskette), CD-ROM, magnetic tape, or optical disk (the last four being located in disk and tape drives 220). While the specification describes the enhanced OS as performing the features of the preferred embodiment, in actuality, the enhanced OS merely provides the instructions to the microprocessor to perform those features.

Referring again to FIG. 1, the enhanced OS includes a "smart" STREAMS device driver 40, referred to as the "negotiator", for taking direct control over I/O requests to and from user process 10. Alternately, one of module(s) 30 could be the negotiator. "I/O redirection" occurs when negotiator 40 detects one or more conditions/events from user process 10 indicating that intervening processing is unnecessary. For example, based on the particular user process 10, negotiator 40 recognizes that intervening processing is unnecessary when it receives a specific system call. In this case, negotiator 40 recognizes that user process can receive and/or transmit data with no further formatting, as in a bulk data transfer or in the ability to handle data in an unprocessed, raw form.

In essence, negotiator 40 initiates a procedure for temporarily removing processing by module(s) 30 and stream head 20. Therefore, if the procedure has been successfully installed, messages and data travel from device driver 40 to user process 10 without intervening processing at module(s) 30.

Figure 1:
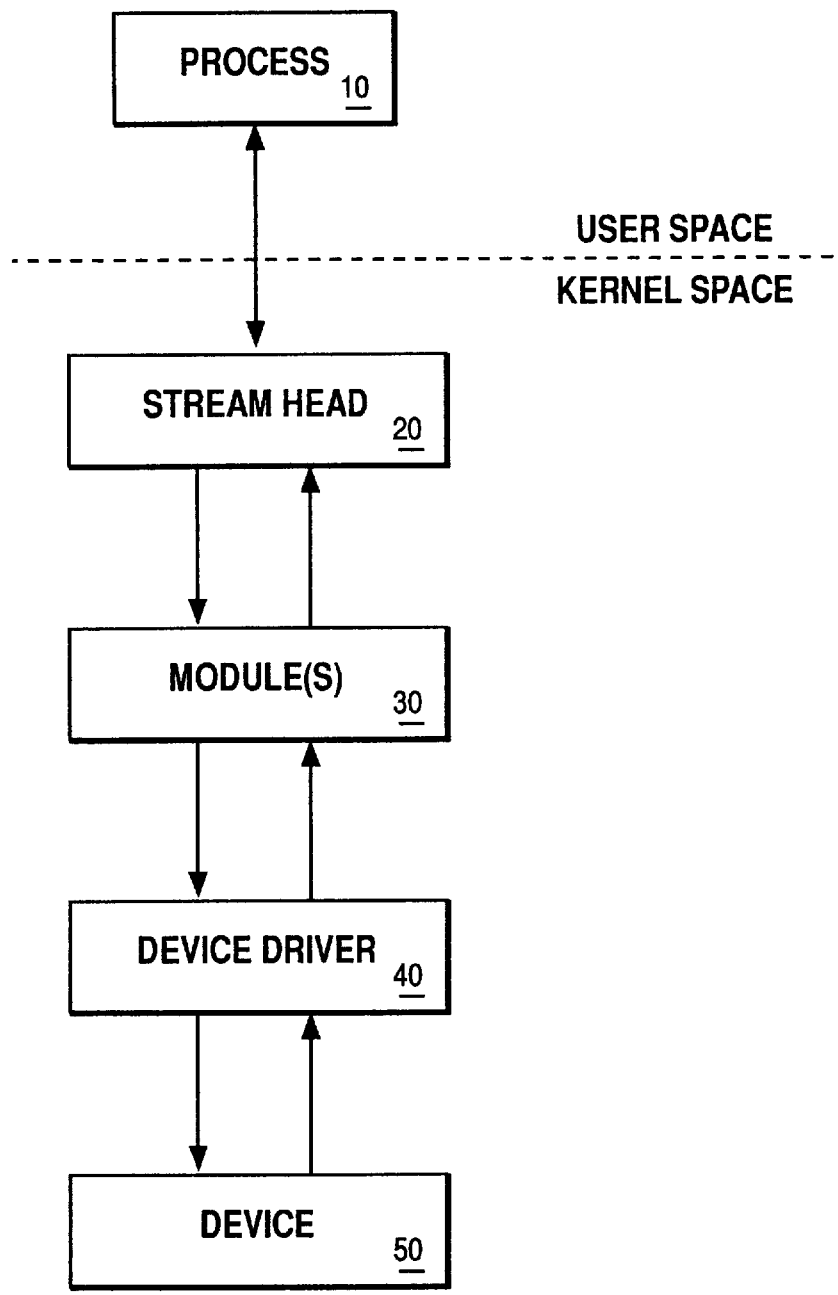
FIG. 1 illustrates a block diagram of a prior art Stream.
Figure 3:
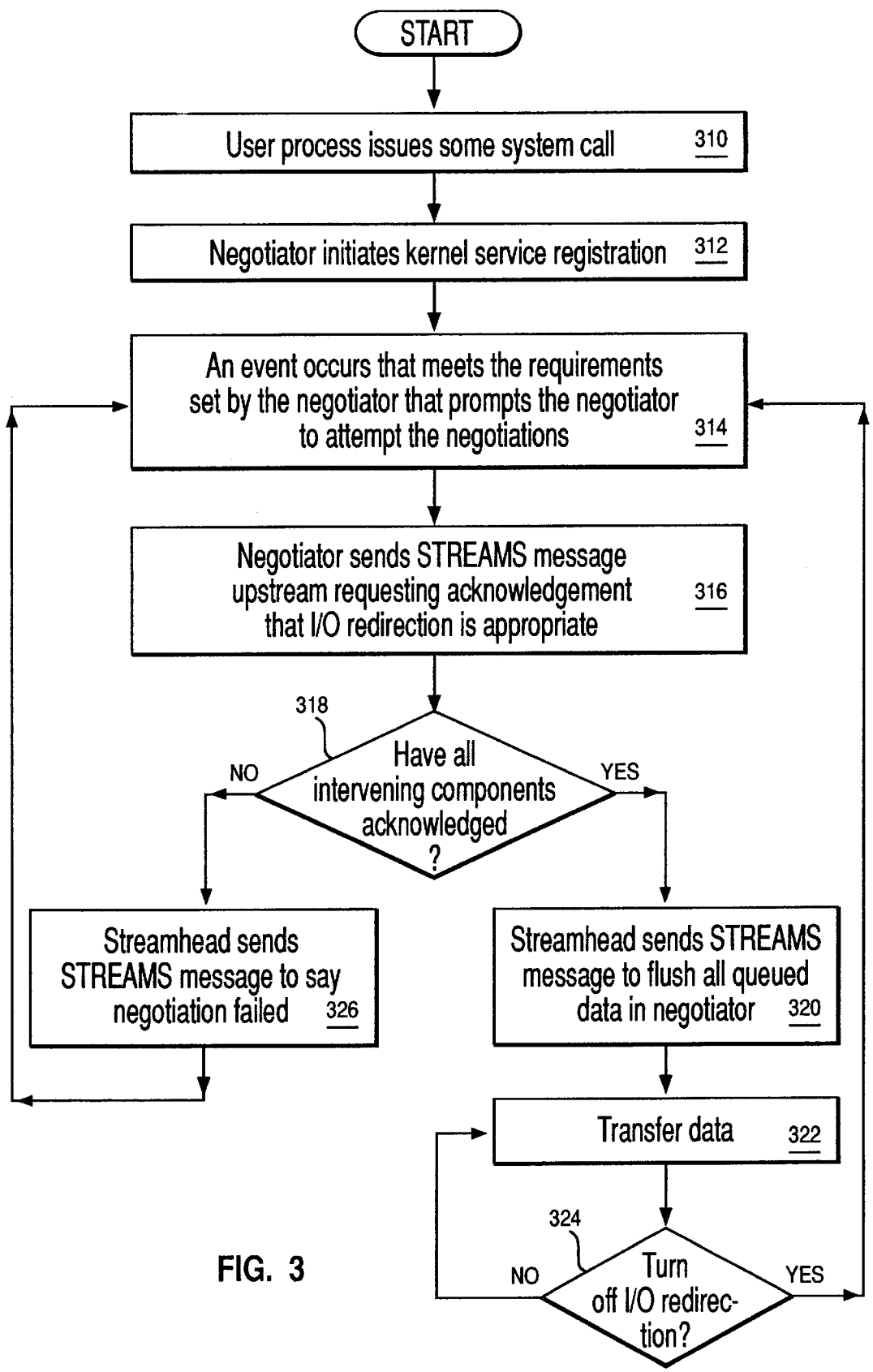
FIG. 3 illustrates a flow diagram of detailed logic for implementing an I/O redirection.

FIG. 3 illustrates a flow diagram of detailed logic for implementing I/O redirection. Referring to FIGS. 1 and 3, at 310, user process 10 issues an initiating system call, such as an OPEN system call. In response, at 312, negotiator 40 registers new I/O entry points (e.g., read, write, and select) with stream head 20. Should I/O redirection occur, stream head 20 directly calls those entry points of negotiator 40 when user process 10 issues I/O requests, instead of performing the normal STREAMS processing of building a message block and passing it down the Stream.

At 314, an event (e.g., system call generated by user process 10) occurs that is recognized by negotiator 40 indicating that I/O redirection may be appropriate. The event is dependent on the type of user process 10, the type of device driver 40, and the type of device 50. For example, an event could be an application initiating a file transfer.

At 316, "negotiation" begins when negotiator 40 sends a STREAMS "negotiation" message, along with the negotiator 40's address, upstream to stream head 20 requesting acknowledgement that I/O redirection is appropriate. Each STREAMS component linked between negotiator 40 and stream head 20 processes the negotiation message if it recognizes it. Specifically, if a component recognizes the negotiation message, the component increments a counter by one and passes the counter and negotiation message to the next component. If the next component does not recognize the negotiation message, it merely passes the counter, without incrementing it, and negotiation message to the next component. Eventually, the counter and negotiation message pass to stream head 20.

At 318, stream head 20 verifies that all intervening STREAMS components between itself and negotiator 40 have acknowledged that I/O redirection is appropriate. To do this, stream head 20 decrements the received counter by one for each component downstream until the counter decrements to zero. At that point, stream head 20 compares the address of the component pointed to after the counter has been decremented with the negotiator address previously transmitted to stream head 20. If the addresses match, then each STREAMS component between negotiator 40 and stream head 20 has acknowledged that I/O redirection is appropriate. If the addresses do not match, then at least one STREAMS component between negotiator 40 and stream head 20 did not acknowledge I/O redirection. In that case, at 326, stream head 20 turns I/O redirection off by sending a message downstream to negotiator 40 indicating that negotiations failed.

If each STREAMS component between the negotiator and stream head 20 acknowledges I/O redirection, at 320, stream head 20 sends a STREAMS message to flush all queued data to negotiator 40. This STREAMS message informs negotiator 40 that I/O redirection is permitted and ensures that negotiator 40 passes any data queued between itself and stream head 20 to user process 10 in FIFO order. At 322, data transfers take place between device 50 and user process 10 using I/O redirection.

At 324, a determination is made on whether to turn off the I/O redirection based on several events, such as, for example, if user process 10 issues a CLOSE system call, if any modules are pushed or popped from the Stream, or if user process 10 changes device attributes through a system call. If any of these "termination-indication" events occur, step 324 directs control to step 314.

While the invention has been shown and described with reference to particular embodiments thereof, it will be understood by those skilled in the art that the foregoing and other changes in form and detail may be made therein without departing from the spirit and scope of the invention, which is defined only by the following claims.

We claim:

1. A computer-implemented method for generating a high performance communication path in a computer system, the communication path having a plurality of linked components, at least one component being a negotiator and one being a controller, comprising the steps of:
   registering the negotiator with the controller;
   verifying acknowledgement of negotiation from at least one intervening component between the negotiator and the controller to determine whether any intervening processing is required by the intervening component, wherein the intervening component is located in a first communication path; and
   in response to a valid verification wherein no intervening processing is required, selecting a second communication path for redirecting I/O between the controller and the negotiator, wherein the second communication path bypasses the intervening component.

2. The method according to claim 1, wherein said registering step comprises the step of:
   registering I/O entry points of the negotiator with the controller.

3. The method according to claim 2, wherein said step of redirecting I/0 between the controller and the negotiator comprises the step of:
   if a user process issues an I/O request, directly calling the I/O entry points of the negotiator by the controller using the second communication path.

4. The method according to claim 1 wherein the negotiator is a driver.

5. The method according to claim 1 wherein the negotiator is a module.

6. The method according to claim 1 wherein the controller is a stream head.

7. The method according to claim 1 wherein the controller communicates to a user process.

8. A computer system having a high performance communication path, the communication path having a plurality of linked components, at least one component being a negotiator and one being a controller, comprising:
   a processor for registering the negotiator with the controller;
   said processor for verifying acknowledgement of negotiation from at least one intervening component between the negotiator and the controller to determine whether any intervening processing is required by said intervening component, wherein said intervening component is located in a first communication path; and
   in response to a valid verification wherein no intervening processing is required, said processor for selecting a second communication path for redirecting I/O between the controller and the negotiator, wherein said second communication path bypasses said intervening component.

9. The computer system according to claim 8, wherein said processor registers I/O entry points of the negotiator with the controller.

10. The computer system according to claim 9, wherein said processor further comprises:
    if a user process issues an I/O request, said processor directly calls the I/O entry points of the negotiator by the controller using said second communication path.

11. The computer system according to claim 8 wherein the negotiator is a driver.

12. The computer system according to claim 8 wherein the negotiator is a module.

13. The computer system according to claim 8 wherein the controller is a stream head.

14. A memory embodying computer-readable detailed logic for generating a high performance communication path in a computer system, the communication path having a plurality of linked components, at least one component being a negotiator and one being a controller, comprising the steps of:
    first computer readable detailed logic executable to register the negotiator with the controller;
    second computer readable detailed logic executable to verify acknowledgement of negotiation from at least one intervening component between the negotiator and the controller to determine whether any intervening processing is required by said intervening component, wherein said intervening component is located in a first communication path; and
    in response to a valid verification wherein no intervening processing is required, third computer readable detailed logic executable to select a second communication path for redirecting I/O between the controller and the negotiator, wherein said second communication path bypasses said intervening component.

15. A method for communicating between a stream head and a device driver of a computer system, wherein a first communications path is defined between the stream head and the device driver using one or more intervening modules, the method comprising the steps of:

registering the device driver with the stream head;

verifying acknowledgement of negotiation from at least one of the intervening modules to determine whether any intervening processing is required by the at least one intervening module, using the first communication path; and in response to a valid verification wherein no intervening processing is required, bypassing the at least one intervening module by redirecting I/O between the stream head and the device driver using a second communications path.

* * * * *